(12) United States Patent
Jung et al.

(10) Patent No.: US 9,872,300 B2
(45) Date of Patent: Jan. 16, 2018

(54) METHOD AND APPARATUS FOR SCHEDULING USER EQUIPMENTS BASED ON LEVELS THEREOF IN MOBILE COMMUNICATION SYSTEM

(71) Applicant: Samsung Electronics Co., Ltd., Suwon-si (KR)

(72) Inventors: Daekwon Jung, Suwon-si (KR); Heewon Kang, Seongnam-si (KR); Myungkwang Byun, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 176 days.

(21) Appl. No.: 15/000,550

(22) Filed: Jan. 19, 2016

(65) Prior Publication Data

US 2016/0212757 A1 Jul. 21, 2016

(30) Foreign Application Priority Data

Jan. 19, 2015 (KR) .......................... 10-2015-0008692

(51) Int. Cl.
*H04W 72/04* (2009.01)
*H04W 72/12* (2009.01)

(52) U.S. Cl.
CPC .......... *H04W 72/048* (2013.01); *H04W 72/04* (2013.01); *H04W 72/12* (2013.01)

(58) Field of Classification Search
None
See application file for complete search history.

(56) References Cited

U.S. PATENT DOCUMENTS

| 6,721,278 B1* | 4/2004 | Rimhagen | H04W 72/12 370/252 |
|---|---|---|---|
| 2004/0037286 A1* | 2/2004 | Huang | H04W 72/12 370/394 |

(Continued)

FOREIGN PATENT DOCUMENTS

KR 10-1390314 B1 4/2014

OTHER PUBLICATIONS

International Search Report dated May 4, 2016 corresponding to International Application No. PCT/KR2016/000522.

(Continued)

*Primary Examiner* — Hassan Phillips
*Assistant Examiner* — Ayanah George
(74) *Attorney, Agent, or Firm* — McAndrews, Held & Malloy, Ltd.

(57) ABSTRACT

Provided are a method and apparatus for scheduling user equipments. The apparatus for allocating resources to UEs may include: a communication unit to send and receive data to and from one or more UEs; and a control unit to perform a process of determining the first maximum throughput based on channel quality information received from one or more UEs and UE levels, performing a first-stage sorting operation on a list of UEs based on the first maximum throughput and average throughput, performing, when there are two or more UEs that have the same UE level and are adjacent in the list, a second-stage sorting operation on those UEs based on the channel quality information, and allocating resources to at least one UE in the list. Accordingly, when UEs having different UE levels compete for resources, it is possible to increase the overall throughput of the base station.

20 Claims, 6 Drawing Sheets

(56) References Cited

U.S. PATENT DOCUMENTS

| | | |
|---|---|---|
| 2009/0109909 A1 | 4/2009 | Onggosanusi et al. |
| 2013/0163540 A1 | 6/2013 | Roh et al. |
| 2013/0279408 A1 | 10/2013 | Chandra et al. |
| 2015/0103778 A1* | 4/2015 | Kim .................. H04W 72/04 370/329 |

OTHER PUBLICATIONS

LG Electronics, 'Operation in Mode 1 resource allocation for D2D communication', R1-141352, 3GPP TSG RAN WG1 Meeting #76bis, Mar. 22, 2014.

Samsung, 'Mode 1 resource allocation for D2D broadcast communication', R1-141307, 3GPP TSG RAN WG1 Meeting #76bis, Mar. 22, 2014.

* cited by examiner

| SEQUENCE NUMBER (after 1st stage) | 1st Scheduling Metric (after 1st stage) | UE ID | UE Category | CQI |
|---|---|---|---|---|
| 1 | 10520 | 4 | 10 | 22 |
| 2 | 9754 | 1 | 8 | 26 |
| 3 | 9697 | 2 | 8 | 29 |
| 4 | 9507 | 3 | 8 | 25 |
| 5 | 5480 | 5 | 10 | 18 |
| ⋮ | ⋮ | ⋮ | ⋮ | ⋮ |

| SEQUENCE NUMBER (after 2nd stage) | 2nd Scheduling Metric (after 2nd stage) | UE ID | UE Category | CQI |
|---|---|---|---|---|
| 1 | 10520 | 4 | 10 | 22 |
| 2 | 16298 | 2 | 8 | 29 |
| 3 | 11667 | 1 | 8 | 26 |
| 4 | 9507 | 3 | 8 | 25 |
| 5 | 5480 | 5 | 10 | 18 |
| ⋮ | ⋮ | ⋮ | ⋮ | ⋮ |

METHOD AND APPARATUS FOR SCHEDULING USER EQUIPMENTS BASED ON LEVELS THEREOF IN MOBILE COMMUNICATION SYSTEM

RELATED APPLICATIONS

This application claims priority under 35 U.S.C. §119(a) to a Korean Patent Application Serial No. 10-2015-0008692, which was filed in the Korean Intellectual Property Office on Jan. 19, 2015, the entire content of which is hereby incorporated by reference.

BACKGROUND

The present disclosure relates to a method and apparatus for scheduling user equipments based on levels thereof in a mobile communication system. More particularly, the present disclosure relates to a method and apparatus that apply proportional fair scheduling to determine scheduling priorities of user equipments (UEs) in consideration of both UE channel states and UE categories or capabilities in a packet-based mobile communication system.

In a packet-based mobile communication system such as the High Speed Downlink Packet Access (HSDPA) system, radio resources are allocated differently to UEs according to services requested by the UEs. Although users wish to receive various services at high speed, as radio resources are limited in the packet-based mobile communication system, the UEs have to compete with each other for radio resources. For efficient allocation of radio resources, scheduling priorities may be applied to UEs and services. For example, for each unit time (e.g. Transmission Time Interval (TTI)), resources may be allocated first to UEs with a high priority, and those UEs being allocated resources may be allowed to send and receive data to and from the base station or other UEs during the corresponding TTI.

Commonly used scheduling algorithms for radio resource allocation may include: round robin (RR), maximum carrier to interference (Max C/I), and proportional fair (PF). In the RR scheme, resources are allocated in sequence to UEs and services managed by the base station, heightening fairness. In the Max C/I scheme, resources are allocated first to a UE with the best channel condition, heightening overall throughput. The PF scheme tries to enhance both fairness and throughput by making good use of the strengths of the RR and Max C/I schemes.

The PF scheme aims to maximize the long-term throughput of a UE with a good channel condition relative to the average throughput. A scheduling priority for a UE may be computed by dividing the maximum throughput or peak throughput by the average throughput in the current channel condition. Proportional fair scheduling may be implemented in various ways according to communication systems or designs.

In PF scheduling, for a UE, the scheduling priority may be computed based on the maximum throughput in the current channel condition identified using channel quality information. In this case, those UEs that have the same channel quality but have different physical layer capabilities may have the same scheduling priority.

Generally, as a UE having a high physical layer capability is of a high price and has a high level, it has a high maximum throughput. In the case of resource allocation to UEs with different levels, when scheduling is performed based solely on channel quality information of each UE although overall channel conditions are acceptable, a UE having a high maximum throughput may miss an additional scheduling opportunity. In particular, when overall channel conditions are acceptable and UEs with different levels compete with each other, it is highly probable that the overall throughput of the base station is lowered.

SUMMARY

Aspects of the present disclosure are to address at least the above mentioned problems and/or disadvantages and to provide at least the advantages described below. Accordingly, an aspect of the present disclosure is to provide a method for performing proportional fair scheduling in consideration of not only UE channel conditions but also UE categories or capabilities.

In accordance with an aspect of the present disclosure, there is provided a method for resource allocation that is performed by a base station (ENB) to allocate resources to user equipments (UEs). The method may include: determining the first maximum throughput for each UE based on channel quality information received from one or more UEs and UE levels; performing a first-stage sorting operation on a list of the UEs based on the first maximum throughput and average throughput of each UE; performing, when there are two or more UEs that have the same UE level and are adjacent in the list, a second-stage sorting operation on the UEs that have the same UE level and are adjacent in the list based on the channel quality information; and allocating resources to at least one UE in the list based on the result of the second-stage sorting operation.

In accordance with another aspect of the present disclosure, there is provided an apparatus for allocating resources to user equipments (UEs). The apparatus may include: a communication unit to send and receive data to and from one or more UEs; and a control unit to perform a process of determining the first maximum throughput for each UE based on channel quality information received from one or more UEs and UE levels, performing a first-stage sorting operation on a list of the UEs based on the first maximum throughput and average throughput of each UE, performing, when there are two or more UEs that have the same UE level and are adjacent in the list, a second-stage sorting operation on the UEs that have the same UE level and are adjacent in the list based on the channel quality information, and allocating resources to at least one UE in the list based on the result of the second-stage sorting operation.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
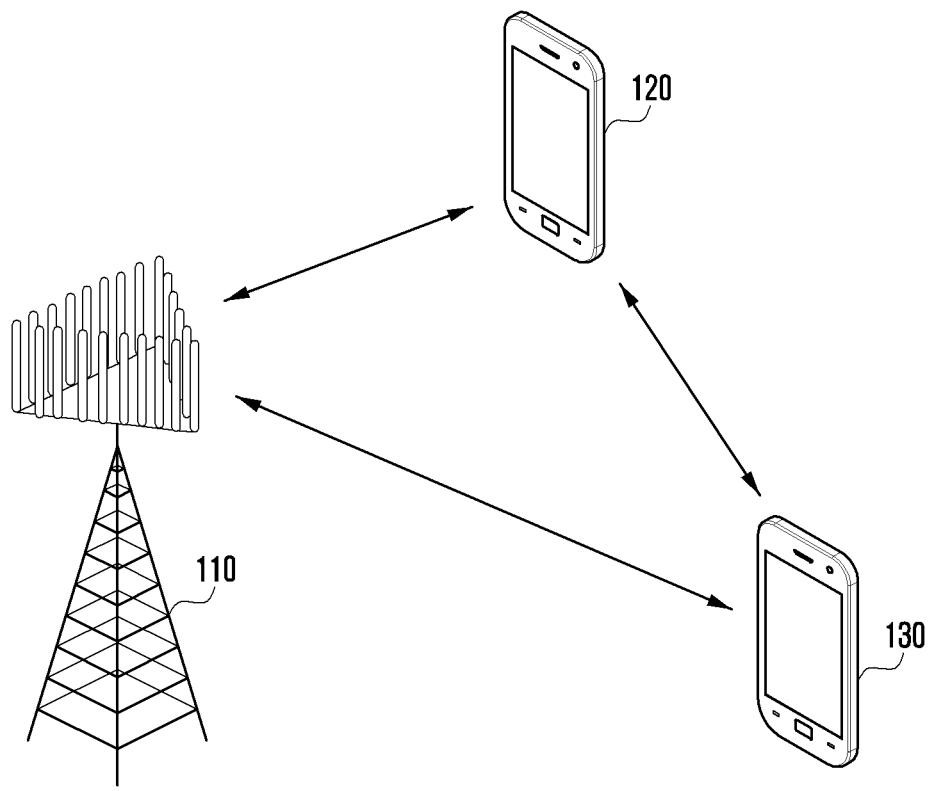
FIG. 1 illustrates communication between a base station and user equipments in a wireless network.

Hereinafter, various embodiments of the present disclosure are described in detail with reference to the accompanying drawings. Detailed descriptions of well-known functions and structures incorporated herein may be omitted to avoid obscuring the subject matter of the present disclosure. Those of ordinary skill in the art will recognize that various changes and modifications of the embodiments described herein can be made without departing from the scope and spirit of the present disclosure. In the drawings, some elements are exaggerated, omitted, or only outlined in brief, and thus may be not drawn to scale.

In the description and in the claims, the terms "comprises", "comprising", "includes", "including", "has", "having", or any other variation thereof are intended to cover a non-exclusive inclusion. The singular forms "a", "an" and "the" are intended to include the plural forms as well, unless the context clearly indicates otherwise. The word "unit", "module" or the like refers to a software component, a hardware component, a firmware component or a combination thereof, which is capable of carrying out a function or an operation. The terms "first", "second", "third" and the like in the description are used for distinguishing between similar elements and not necessarily for describing a sequential or chronological order.

In the description and in the claims, a "base station" indicates a device that schedules (or allocates resources to) one or more user equipments, and may be referred to as Evolved Node B, EnodeB, ENB, or Node B. A "terminal" indicates a device that is allocated resources by a base station, and may be referred to as a user equipment (UE) or mobile station. When a terminal schedules other UEs, it may be referred to as a base station.

In the description and in the claims, a "level" of a terminal indicates one of classes of UEs formed by classifying UEs according to a given criterion such as modulation scheme or maximum bit rate. The word "level" may be used interchangeably with "category" or "capability" for physical layer transmission. In the description and in the claims, "scheduling" or "resource allocation" may be conducted for both the uplink and the downlink.

In a typical mobile communication system, UEs with different UE levels compete with each other for a scheduling opportunity. It is highly probable that a UE with a high UE level is of a high price and has a high user throughput. In the event that UEs with the same UE level complete with each other and maximum throughputs are classified according to UE levels regardless of channel quality information, when UEs with low UE levels compete with each other, it is highly probable that user throughputs become similar and the throughput of the base station is lowered.

The present disclosure provides a method that increases the throughput of the base station when a situation in which UEs with different UE levels complete with each other for scheduling coexists with another situation in which UEs with the same UE level complete with each other for scheduling. To this end, in proportional fair scheduling based on the maximum throughput of a UE, computation of the maximum throughput may be performed both in consideration of the UE level and without consideration thereof. Here, to prevent an excessive increase in the amount of computation, a limit may be placed on the number of UEs whose throughput is to be calculated.

FIG. 1 illustrates communication between a base station and user equipments in a wireless network.

In FIG. 1, an ENB 110 sends and receives data to and from a UE 120 and a UE 130. A scheduler of the ENB 110 may perform scheduling, or resource allocation, for the UE 120 and UE 130 for downlink transmission or uplink transmission. In addition, data transmission and reception is possible between UEs. To this end, the scheduler of a UE may perform scheduling for data transmission and reception to and from the other UE. For example, the UE 120 may perform scheduling for communication with the UE 130. In this case, the UE 120 may be referred to as a base station.

In a mobile communication system, a base station may communicate with UEs with various UE levels. To communicate with the base station, a UE sends information containing a UE level indication to the base station. Table I illustrates UE categories used for a Universal Mobile Telecommunications System (UMTS) physical layer in the downlink, as an example of UE levels. Also, $3^{rd}$ Generation Partnership Project (3GPP) standards specify multiple UE levels covering a wide range of devices from low-end to high-end. This enables terminal manufacturers to place low-end UEs early on the market, facilitating early adoption and commercialization of the UMTS communication system.

TABLE I

| UE category | Maximum number of HS-DSCH codes | Minimum inter-TTI interval | Supported modulations Quadrature Phase Shift Keying (QPSK), 4-bit Quadrature amplitude modulation (16QAM) | Maximum number of bits of an HS-DSCH transport block size [bits] |
| --- | --- | --- | --- | --- |
| 1 | 5 | 3 | QPSK, 16QAM | 7298 |
| 2 | 5 | 3 | QPSK, 16QAM | 7298 |
| 3 | 5 | 2 | QPSK, 16QAM | 7298 |
| 4 | 5 | 2 | QPSK, 16QAM | 7298 |
| 5 | 5 | 1 | QPSK, 16QAM | 7298 |
| 6 | 5 | 1 | QPSK, 16QAM | 7298 |
| 7 | 10 | 1 | QPSK, 16QAM | 14411 |
| 8 | 10 | 1 | QPSK, 16QAM | 14411 |
| 9 | 15 | 1 | QPSK, 16QAM | 20251 |
| 10 | 15 | 1 | QPSK, 16QAM | 27952 |
| 11 | 5 | 2 | QPSK | 3630 |
| 12 | 5 | 1 | QPSK | 3630 |
| 13 | 15 | 1 | QPSK, 16QAM, 64QAM | 35280 |
| 14 | 15 | 1 | QPSK, 16QAM, 64QAM | 42192 |

Even a UE with the best channel quality information is not allowed to send data with a size greater than that specified for the UE level in one TTI. For example, referring to Table I, the HS-DSCH transport block size of a UE category 6 cannot exceed 7298 bits, and the HS-DSCH transport block size of a UE category 8 cannot exceed 14411 bits. The UE categories listed Table I are an instance of classification, and a larger category index does not necessarily correspond to a higher transmission capability.

Figure 2:
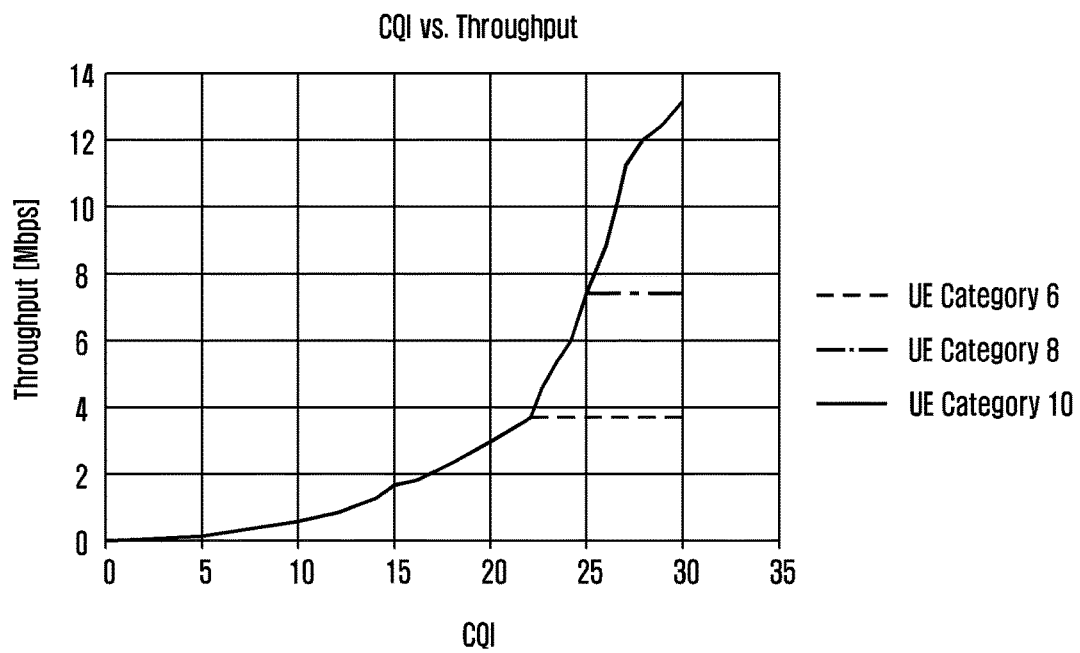
FIG. 2 is a graph of changes in the maximum throughput with the increasing CQI.

FIG. 2 is a graph of changes in the maximum throughput with the increasing CQI.

The channel quality indicator (CQI) is a type of channel quality information. The higher the CQI, the better the channel is. In one embodiment, it can be assumed that the CQI is an integer value ranging from 1 to 30. In FIG. 2, when the CQI is less than 22, the maximum throughput increases for category 6, 8 or 10. When the CQI is greater than or equal to 22, the maximum throughput for category 6 does not increase further with a saturation of 3.6 Mbps. When the CQI is greater than or equal to 25, the maximum throughput for category 8 does not increase further with a saturation of 7.2 Mbps.

As shown in FIG. 2, the maximum throughput for a UE category 10 is about 2.8 Mbps when the CQI is 30. Specifically, when the CQI is 30, if transmission is repeated with success at a throughput of 12.8 Mbps, the scheduler may determine that the actual channel quality of the UE is better than the channel quality corresponding to the CQI of 30 and increase the transport block size (TBS). In this case, transmission using a larger transport block size does not increase the throughput beyond 14.0 Mbps.

Figure 3:
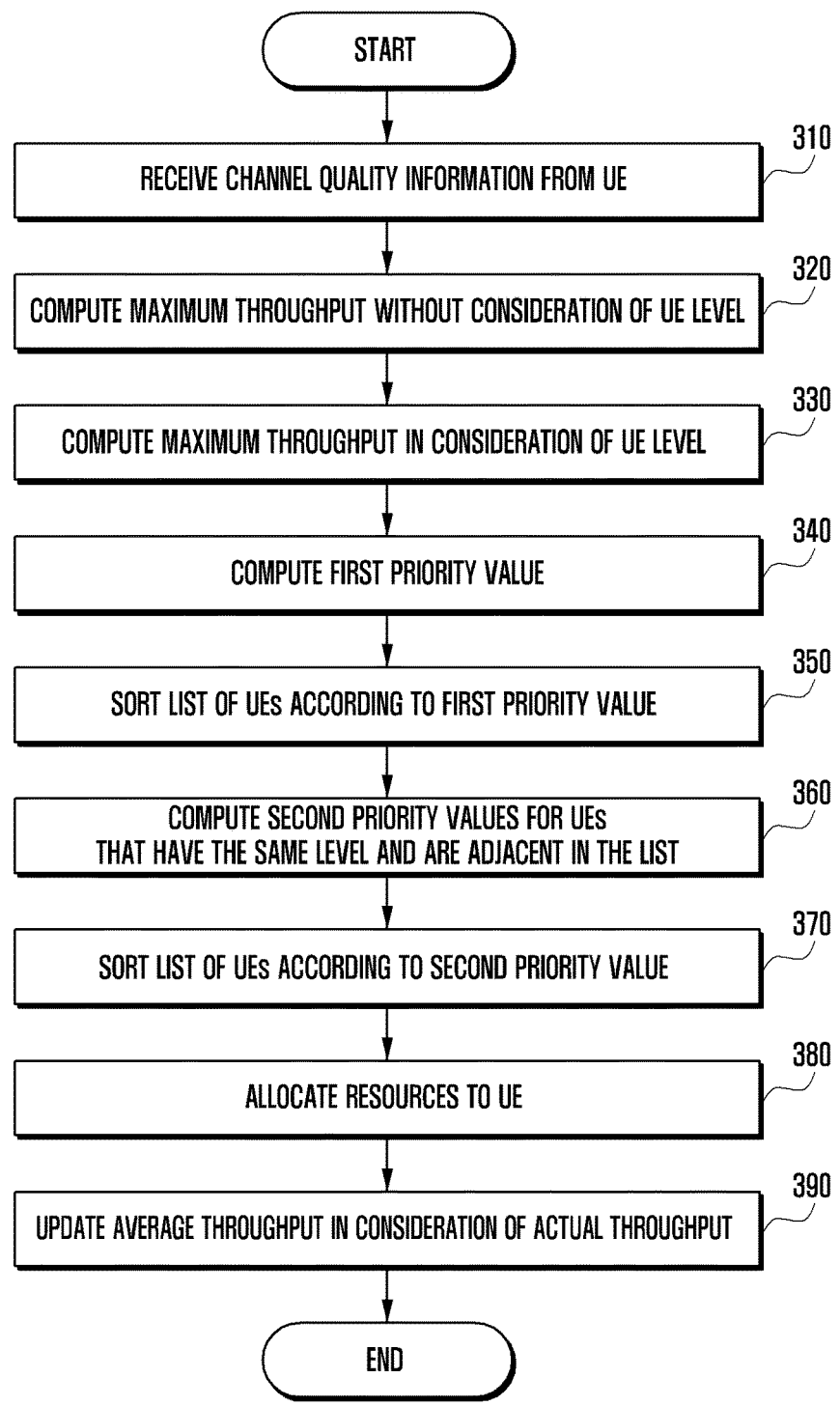
FIG. 3 is a flowchart of a procedure performed by the base station to conduct scheduling by use of UE levels and channel quality information.

FIG. 3 is a flowchart of a procedure performed by the base station to conduct scheduling by use of UE levels and channel quality information.

At step 310, the ENB receives channel quality information from one or more UEs. Here, the channel quality information may include the CQI. At step 320, the ENB computes the second maximum throughput of each UE by use of the received channel quality information without consideration of the UE level. For example, in FIG. 2, when a CQI of 25 is received from a UE, the second maximum throughput of the UE may be set to 7.2 Mbps regardless of whether the UE is of category 6, 8 or 10. When a CQI of 30 is received from a UE, the second maximum throughput of the UE may be set to 12.8 Mbps regardless of whether the UE is of category 6, 8 or 10.

At step 330, the ENB computes the first maximum throughput of each UE in consideration of the UE level. For example, in FIG. 2, when a CQI of 30 is received from a UE, the first maximum throughput of the UE is set to 7.2 Mbps if the UE is of category 8, and is set to 3.6 Mbps if the UE is of category 6. When a CQI of 25 is received from a UE, the first maximum throughput of the UE is set to 7.2 Mbps if the UE is of category 8 or 10, and is set to 3.6 Mbps if the UE is of category 6. In FIG. 2, three UE categories are shown. However, the number of UE levels or categories is not limited to three.

In the present disclosure, a priority value is defined to be a value obtained by dividing a maximum throughput by an average throughput as shown by EQN. (1) below. The priority value may be referred to as a scheduling metric.

$$\text{priority value} = \frac{\text{maximum throughput}}{\text{average throughput}} \quad \text{EQN. (1)}$$

The average throughput may be computed in various ways. The time duration used to compute the average throughput may be specified in various ways. For example, in the Wideband Code Division Multiple Access (WCDMA) system, the time duration may be set to 1024 subframes (about 2 seconds) or 512 subframes (about 1 second).

EQN. (2) indicates infinite impulse response (IIR) filtering as a scheme for computing the average throughput.

$$\text{average throughput}[n] = \frac{\alpha \cdot \text{average throughput}[n-1] +}{\text{FILTERING\_WINDOW\_SIZE}} \quad \text{EQN. (2)}$$

where $$\alpha + \beta = \text{FILTERING\_WINDOW\_SIZE}$$

The current subframe number is denoted by n, the previous frame number is denoted by n−1, and FILTERING_WINDOW_SIZE may correspond to an integer multiple of the subframe size.

When $\alpha > \beta$, the past throughput is more weighted, the average throughput changes relatively slowly. When $\alpha < \beta$, the current throughput is more weighted, the average throughput changes relatively rapidly.

As shown in EQN. (2), Infinite impulse response (IIR) filtering does not strictly specify the interval to be included for throughput computation, and tends to place more weight on the current throughput compared with the past throughput.

At step 340, the ENB computes the first priority value of each UE by dividing a first maximum throughput by an average throughput. At step 350, the ENB sorts a list of UEs in descending order of the first priority value to determine a sequence for resource allocation. That is, a UE with the highest first priority value comes first in the list, and resources may be allocated first to the UE placed first in the list. Alternatively, the list of UEs may be sorted in ascending order of the first priority value, and resources may be allocated first to the UE placed last in the list. Computing first priority values for UEs and sorting the list of UEs by first priority value are referred to as a first stage. In the first stage, all UEs are sorted.

At step 360, in the list of UEs sorted by the first priority value, the ENB computes second priority values for UEs that have the same UE level and are adjacent in the list by dividing the second maximum throughput by the average throughput. At step 370, the ENB sorts the list of UEs whose second priority value is computed in descending order of the second priority value. Computing second priority values for some UEs and sorting those UEs by the second priority value are referred to as the second stage. In the second stage, only UEs that have the same UE level and are adjacent in the list are sorted. The time interval used to compute the average throughput for the first priority value may be the same as or different from that for the second priority value.

Sorting at the first stage and the second stage may be performed at regular intervals on a periodic basis. This period may correspond to, for example, an integer multiple of the TTI.

At step 380, the ENB allocates resources to UEs in the list according to the results of second stage sorting. For example, resources may be allocated first to a UE with the highest second priority value. At step 390, whenever transmission is performed after resource allocation, the ENB updates the average throughput for the corresponding UE in consideration of actual throughput. Later, the updated average throughput may be used to compute the first priority value or the second priority value.

Figure 4:
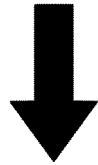
FIG. 4 is tables for sorting UEs according to their priorities.

FIG. 4 is tables for sorting UEs according to their priority values.

Table 410 shows a result of a first stage sorting. In table 410, UEs are arranged in descending order of the first scheduling metric. As some UEs (ID=1, 2, 3) have the same UE level (category 8) and are adjacent as listed in shaded portion of the table, these UEs are targets for second stage sorting.

Table 420 shows the result of second stage sorting. In table 420, unlike table 410, the UE (ID=2) having a second priority value of 16298 precedes the UE (ID=1) having a second priority value of 11667. That is, UEs that are targets for second stage sorting (UE ID=1, 2, 3) are arranged in descending order of the second scheduling metric.

In FIG. 4, three UEs are depicted as having the same UE level and being adjacent in the list. This scheme is also applicable to other cases (e.g., two or four UEs that have the same UE level and are adjacent in the list).

When the number of UEs requesting resource allocation approaches the maximum number of UEs accommodable in the scheduler, if both the first stage processing and the second stage processing are to be performed within one TTI, the scheduler may become unstable due to an excessive amount of computation. To prevent a rapid increase in the amount of computation, the second stage processing may be applied to UEs that have a high priority after performance of the first stage processing. For example, the second stage processing may be applied only to UEs that fall in the top M percent (or top N UEs) with respect to the first priority value. Here, N may be sufficiently greater than the statistical maximum number of UEs scheduled in one TTI.

In the above description, the sequence of UEs for resource allocation is determined through the first stage processing and the second stage processing. In the second stage, the second priority value may be determined in various ways. For example, the second priority value may be determined by using at least one of the maximum throughput without consideration of the UE level, CQI, and average throughput.

Before resource allocation to a UE, a third stage may be added. For example, in the third stage, those UEs that fall in the top P percent (or top Q UEs) with respect to the second priority value may be sorted by using the maximum throughput without consideration of the UE level as the third priority value. Here, the second stage may be skipped.

In FIG. 3 and FIG. 4, the scheduling priority is determined with respect to the throughput. However, the scheduling priority may also be determined with respect to the transmission data size. In this case, "maximum throughput", "average throughput", "actual throughput" may be replaced by "maximum transmissible data size", "average transmission data size", and "actual transmission data size", respectively.

Figure 5:
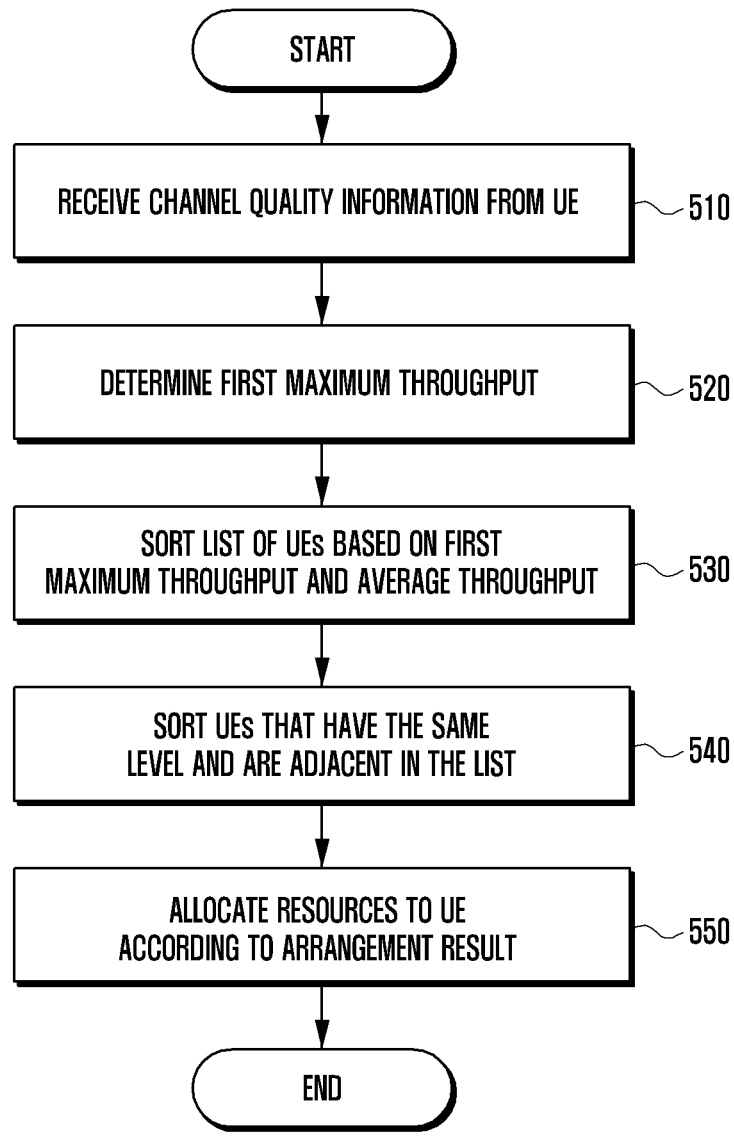
FIG. 5 is a flowchart of a procedure performed by the base station to allocate resources to UEs.

FIG. 5 is a flowchart of a procedure performed by the base station to allocate resources to UEs.

At step 510, the ENB receives channel quality information from one or more UEs. Here, the channel quality information may include the CQI. Individual UEs are classified into UE levels. UE levels may correspond to UE categories. At step 520, the ENB determines the first maximum throughput of each UE by use of the channel quality information and the UE level.

In the ENB and UE, channel quality information may be represented by segment numbers. That is, the range of channel quality may be divided into segments, and distinct numbers or indexes may be assigned respectively to the segments. Hence, transmission and reception of channel quality information may correspond to transmission and reception of a segment number or segment index. When a UE sends a segment number as channel quality information to the ENB, the ENB may compute the first maximum throughput of the UE based on the segment number and the UE level. This computation may correspond to retrieval of a maximum throughput value from a stored list of mappings between segment numbers, UE levels, and maximum throughput values.

At step 530, the UE sorts the list of UEs according to the first maximum throughput and average throughput. For a UE, the average throughput indicates the average of throughput values measured between the UE and ENB for a given time duration (from some point in time in the past to the present). The ENB may compute the first priority value of each UE by dividing the first maximum throughput by the average throughput, and sort the list of UEs in descending order of the first priority value.

At step 540, if there are two or more UEs that have the same UE level and are adjacent in the list, the ENB arranges the UEs that have the same UE level and are adjacent in the list. Here, the sameness in UE level may indicate the sameness in UE category.

Arrangement at step 540 may include a process of, for each of the UEs that have the same UE level and are adjacent in the list, determining the second maximum throughput based on the channel quality information without consideration of the UE level and computing the second priority value by dividing the second maximum throughput by the average throughput, and sorting those UEs in descending order of the second priority value.

Arrangement of step 540 may be applied to a fixed number of UEs with a high priority based on the result of sorting at step 530. For example, referring to table 410 of FIG. 4, arrangement of step 540 may be applied only to those UEs with sequence numbers 1 to 10. Arrangement of step 540 may also be applied to only UEs that fall in the top M percent of all UEs based on the result of sorting at step 530. For example, referring to table 410 of FIG. 4 and assuming that 20 UEs are present in total, arrangement of step 540 may be applied only to those UEs with sequence numbers 1 to 4 (20 percent from the top).

At step 540, the ENB may not compute the second priority value and directly sort the UEs that have the same UE level and are adjacent in the list in descending order of the second maximum throughput. For each UE, the second maximum throughput may be determined earlier than the first maximum throughput.

Similarly to the first maximum throughput, the ENB may compute the second maximum throughput based on a segment number or segment index. This computation may correspond to retrieval of a maximum throughput value from a stored list of mappings between segment numbers and maximum throughput values. Before determining the first maximum throughput, the ENB may create a list of mappings between UE levels and second maximum throughput values and store the list in advance. Then, the first maximum throughput may be determined using the list.

At step 550, the ENB allocates resources to at least one UE based on the result of arrangement at steps 530 and 540. For example, referring to table 420 of FIG. 4, the ENB may perform resource allocation according to the order of the sequence numbers (first, to the UE (ID=4)). Some or all of UEs having sent channel quality information to the ENB may be allocated resources at step 550.

The procedure shown in FIG. 5 may also be performed by a network node other than the ENB. For example, the procedure shown in FIG. 5 may be applied to a situation in which one UE allocates resources to another UE.

Figure 6:
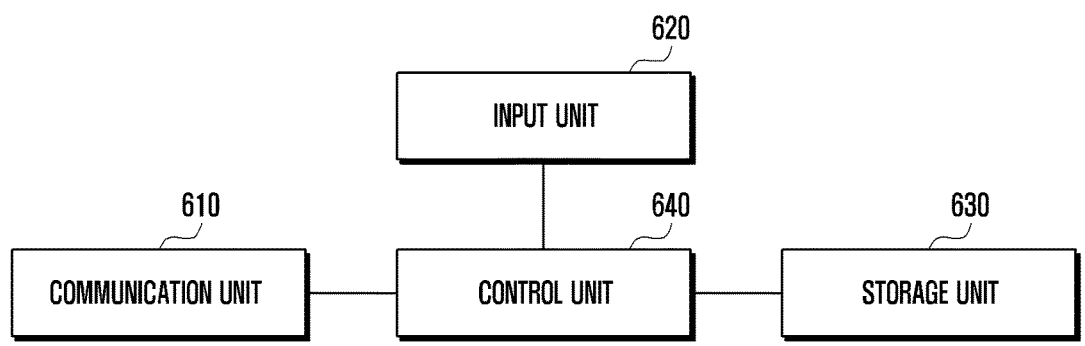
FIG. 6 is a block diagram of an apparatus for allocating resources to UEs.

FIG. 6 is a block diagram of an apparatus for allocating resources to UEs.

Referring to FIG. 6, the apparatus may include a communication unit 610, an input unit 620, a storage unit 630, and a control unit 640. The apparatus may correspond to either a base station or a user equipment.

The communication unit 610 may communicate with a different network node (ENB or UE) and transceive information needed for resource allocation to and from the node. In particular, the communication unit 610 may receive UE level information and channel quality information from a network node.

The input unit 620 may receive an input signal from the user or manager for controlling or configuring functions and forward the input signal to the control unit 640. The input unit 620 may be implemented using a touchscreen or a keypad.

The storage unit 630 may store information collected by the apparatus or entered by the user. The storage unit 630 may store data generated during execution of an application program or a function in the apparatus. In particular, the storage unit 630 may store maximum throughput values, average throughput values, and channel quality information for individual UEs.

The control unit 640 controls overall states and operations of the components of the apparatus. The control unit 640 may control other components to execute a function corresponding to a user input received from the input unit 620. The control unit 640 may control the storage unit 630 to store information received through the communication unit 610. The control unit 640 may control other components to perform operations needed to carry out various embodiments of the present disclosure.

In FIG. 6, the communication unit 610, the input unit 620, the storage unit 630, and the control unit 640 are depicted as being separate blocks having different functions. This is for ease of description only. That is, the above apparatus may have a different configuration.

A step or operation in the above embodiments may be selectively performed or skipped. Steps or operations in the above embodiments may be performed in a sequence different from that listed therein (e.g. in reverse or in parallel).

In a feature of the present disclosure, priority values of UEs for proportional fair scheduling are computed in consideration of UE categories or capabilities for physical layer transmission. Specifically, in proportional fair scheduling, the maximum throughput is classified according to UE levels. As a UE having a high transmission capability obtains more scheduling opportunity, when UEs with different UE levels compete with each other, the overall throughput of the base station increases. That is, the method of the present disclosure may efficiently allocate resources to multiple UEs having the same or different UE levels regardless of the distribution of UE levels in a mobile communication system with limited resources. Additionally, a limit may be placed on the number of UEs whose priority is to be calculated, so that too much scheduler computation is avoided.

Hereinabove, various embodiments of the present disclosure have been shown and described for the purpose of illustration without limiting the subject matter of the present disclosure. For example, although the description related to Table I focuses on the UMTS standards, the present disclosure may also be applied to scheduling in other networks such as WiBro.

What is claimed is:

1. A method for resource allocation via a base station (ENB) to allocate resources to user equipments (UEs), the method comprising:
   determining a first maximum throughput for each UE based on channel quality information received from one or more UEs and UE levels;
   performing a first-stage sorting operation on a list of the UEs based on the first maximum throughput and an average throughput of each UE;
   performing, when there are two or more UEs that have same UE level and are adjacent in the list, a second-stage sorting operation on the UEs that have the same UE level and are adjacent in the list based on the channel quality information; and
   allocating resources to at least one UE in the list based on a result of the second-stage sorting operation.

2. The method of claim 1, wherein performing a first-stage sorting operation comprises:
   computing a first priority value by dividing the first maximum throughput by the average throughput of each UE; and
   sorting the list of the UEs in descending order of the first priority value.

3. The method of claim 1, wherein determining the first maximum throughput for each UE comprises:
   determining a second maximum throughput based on the channel quality information; and
   determining the first maximum throughput based on the second maximum throughput and UE level.

4. The method of claim 1, wherein performing a second-stage sorting operation comprises:
   determining, for each of the UEs that have the same UE level and are adjacent in the list, a second maximum throughput based on the channel quality information;
   computing a second priority value by dividing the second maximum throughput by the average throughput of each UE; and
   sorting the UEs that have the same UE level and are adjacent in the list in descending order of the second priority value.

5. The method of claim 1, wherein performing a second-stage sorting operation comprises:
   determining, for each of the UEs that have the same UE level and are adjacent in the list, a second maximum throughput based on the channel quality information; and
   sorting the UEs that have the same UE level and are adjacent in the list in descending order of the second maximum throughput.

6. The method of claim 1, further comprising receiving channel quality information from one or more UEs.

7. The method of claim 1, wherein the channel quality information corresponds to a channel quality indicator (CQI).

8. The method of claim 1, wherein the UE level corresponds to a UE category.

9. The method of claim 2, wherein the UEs having the same UE level are a preset number of UEs having highest first priority values in the list of the UEs after first-stage sorting.

10. The method of claim 2, wherein the UEs having the same UE level are a preset percent of UEs having highest first priority values in the list of the UEs after first-stage sorting.

11. An apparatus for allocating resources to user equipments (UEs), comprising:
a communication unit to send and receive data to and from one or more UEs; and
a control unit to perform a process of determining a first maximum throughput for each UE based on channel quality information received from one or more UEs and UE levels of the UEs, performing a first-stage sorting operation on a list of the UEs based on the first maximum throughput and an average throughput of each UE, performing, when there are two or more UEs that have the same UE level and are adjacent in the list, a second-stage sorting operation on the UEs that have the same UE level and are adjacent in the list based on the channel quality information, and allocating resources to at least one UE in the list based on a result of the second-stage sorting operation.

12. The apparatus of claim 11, wherein the control unit computes a first priority value by dividing the first maximum throughput by the average throughput of each UE, and sorts the list of the UEs in descending order of the first priority value.

13. The apparatus of claim 11, wherein the control unit determines a second maximum throughput for each UE based on the channel quality information, and determines the first maximum throughput based on the second maximum throughput and UE level.

14. The apparatus of claim 11, wherein the control unit determines a second maximum throughput based on the channel quality information, computes a second priority value by dividing the second maximum throughput by the average throughput of each UE, and sorts the UEs that have the same UE level and are adjacent in the list in descending order of the second priority value.

15. The apparatus of claim 11, wherein the control unit determines a second maximum throughput based on the channel quality information, and sorts the UEs that have the same UE level and are adjacent in the list in descending order of the second maximum throughput.

16. The apparatus of claim 11, wherein the communication unit receives channel quality information from one or more UEs.

17. The apparatus of claim 11, wherein the channel quality information corresponds to a channel quality indicator (CQI).

18. The apparatus of claim 11, wherein the UE level corresponds to a UE category.

19. The apparatus of claim 12, wherein the UEs having the same UE level are a preset number of UEs having highest first priority values in the list of the UEs after first-stage sorting.

20. The apparatus of claim 12, wherein the UEs having the same UE level are a preset percent of UEs having highest first priority values in the list of the UEs after first-stage sorting.

* * * * *